United States Patent [19]
Clayton et al.

[11] 3,853,692

[45] Dec. 10, 1974

[54] RUBBER BONDED TO SILICEOUS SURFACES

[75] Inventors: Robert E. Clayton, Westfield; Byron M. Vanderbilt, Scotch Plains, both of N.J.

[73] Assignee: Esso Research and Engineering Company, Linden, N.J.

[22] Filed: Aug. 26, 1968

[21] Appl. No.: 755,425

Related U.S. Application Data

[63] Continuation-in-part of Ser. No. 392,027, Aug. 25, 1964, which is a continuation-in-part of Ser. No. 120,911, June 30, 1961, abandoned, and Ser. No. 138,420, Sept. 15, 1961, abandoned, which is a continuation-in-part of Ser. No. 30,089, May 19, 1960, abandoned.

[52] U.S. Cl............ 161/193, 117/72, 117/126 GS, 260/41.5 A
[51] Int. Cl............................................. B32b 17/10
[58] Field of Search.... 117/126 GS, 72, 76 R, 76 T; 161/193; 260/41.5 A

[56] References Cited
UNITED STATES PATENTS

| | | | |
|---|---|---|---|
| 3,350,345 | 10/1967 | Vanderbilt et al. | 161/193 X |
| 3,364,059 | 1/1968 | Marzocchi et al. | 117/72 |
| 3,376,188 | 4/1968 | Clayton et al. | 117/76 T |

*Primary Examiner*—Ralph S. Kendall
*Attorney, Agent, or Firm*—Anthony Lagani, Jr.

[57] ABSTRACT

A rubber-reinforcing article is prepared by treating glass fibers with a saturated substituted mercapto or epoxy silane such as gamma mercaptopropyl trimethoxy silane or glycidoxypropyl trimethoxy silane and thereafter coated with an unsaturated elastomer in an uncured stage such as natural rubber, polychloroprene, butyl rubber, styrene-butadiene rubber, etc. The elastomer-coated fiber glass is then contacted with a matrix comprising a rubbery polymer containing at least one curing agent for the rubbery polymer and the composite is cured at elevated temperatures.

21 Claims, No Drawings

RUBBER BONDED TO SILICEOUS SURFACES

CROSS REFERENCE TO RELATED APPLICATION

This application is a continuation-in-part of our prior copending application Ser. No. 392,027, filed Aug. 25, 1964, which latter application is in turn a continuation-in-part of our abandoned applications Ser. No. 120,911, filed June 30, 1961, and Ser. No. 138,420, filed Sept. 15, 1961, which latter abandoned application is in turn a continuation-in-part of our earlier application, Ser. No. 30,089, filed May 19, 1960, and now forfeited.

BACKGROUND OF INVENTION

This invention relates to a method for preparing a rubber-reinforcing article and to the reinforcement of rubbery polymers with such article. More particularly, this invention is concerned with glass fibers whose surfaces have been treated with a saturated mercapto silane or epoxy silane and thereafter coated with an unsaturated elastomer in an uncured stage; the resultant elastomer-coated glass fiber is thereafter contacted with a rubbery polymer containing at least one curing agent and the resultant composite is cured at elevated temperatures.

The invention described in copending application Ser. No. 392,027 mentioned above relates to the bonding of siliceous surfaces (e.g. fiber glass, and ceramics, silicates, quartz and silica fillers) to rubbery polymers by treating the siliceous surface with a saturated substituted alkyl silane, contacting it with a matrix comprising a rubbery polymer containing at least one curing agent for the rubbery polymer and curing the composite at elevated temperatures. This technique has been found to be highly useful in the case of siliceous surfaces other than glass fibers but the results obtained with fiber glass are only marginally satisfactory.

SUMMARY OF INVENTION

It has now been found that the adhesion of glass fibers to a rubbery polymer matrix is greatly increased by applying a thin elastomer top coating to the surface of a saturated substituted mercapto or epoxy silane-treated fiber glass prior to contact with the rubbery polymer matrix. The thin elastomer top coating acts as a barrier to prevent any deleterious reaction between the silane present on the glass fiber surfaces and certain compounding ingredients present in the rubbery polymer matrix. The thin elastomer top coating also serves to more fully integrate the glass fibers with the rubbery polymer matrix, particularly where the glass fibers are made up of twisted strands which present a "rippled" surface, thus leading to voids and incomplete contact of the fibers and the matrix. Finally, the thin elastomer top coating aids in the prevention of abrasion of the fibers and slippage of the fibers in the matrix during periods of flexure and tension undergone by the matrix. This latter consideration is important where the fiber-reinforced matrix is employed in tires, hoses, endless belts, etc.

DETAILED DESCRIPTION

This invention relates to a method for bonding polymers to siliceous surfaces, e.g. glass fibers. More particularly, the invention is concerned with curing a rubbery polymer in contact with glass having a mercapto or epoxy silane finish therein.

The reinforcing agent employed in this invention is glass fiber. The term "glass fiber" includes glass monofilaments, yarns, rovings, strands, mats, staple yarns, woven fabrics, woven rovings, cord and chopped rovings.

In the first step for preparing a rubber reinforcing article, the glass fiber surfaces are treated with a liquid composition containing a saturated substituted silane, or its corresponding silanol (i.e. the partially or fully hydrolyzed derivative of the silane) or its corresponding siloxane (the polymeric form of the silanol) or mixtures of the silane, silanol and siloxane. The silane has the general formula:

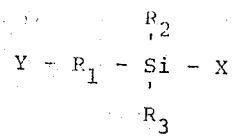

wherein Y is selected from the group consisting of mercapto, epoxy and mixtures thereof; $R_1$ is selected from the group consisting of alkylene, isoalkylene, and cycloalkylene, each of 2 to 16 carbon atoms; X is selected from the group consisting of a halogen, hydroxyl, alkoxy, and acyloxy group; $R_2$ and $R_3$ are selected independently from the group consisting of $Y - R_1 -$, $X -$, and methyl. The $R_1$ group may also contain more than one substituent group so long as no single carbon atom holds more than one such group. Condensation products of the substituted alkyl silanes are also applicable.

Illustrative of suitable silanes within this structural formula are : gamma-glycidoxypropyl trimethoxysilane, beta (3,4-epoxycyclohexyl) ethyl trimethoxysilane, beta-glycidoxyethyl triethoxysilane, beta-(3,4-epoxy-cyclohexyl) ethyl tri(beta-methoxyethoxy) silane, beta-(3-epoxyethylphenyl) ethyl trimethoxysilane, gamma-glycidoxypropyl dimethyl methoxysilane, beta-(epoxyethyl) ethyl triethoxysilane, 4,5-epoxy-n-hexyl trimethoxysilane, 7,8-epoxy-n-octyl tripropoxysilane, 15,16-epoxy-n-hexadecyl trimethoxysilane, 3-methylene-7-methyl-6,7-epoxyoctyl trimethoxysilane, and their corresponding silanols and siloxanes; the mercapto alkyl silanes such as beta-mercaptoethyl trimethoxysilane, beta-mercaptopropyl trimethoxysilane, beta-(2-mercaptocyclohexyl) ethyl trimethoxysilane, beta-mercaptoethyl triethoxysilane, gamma-mercaptopropyl dimethyl methoxy-silane, beta-mercaptoethyl triacetoxysilane, and their corresponding silanols and siloxanes.

The mercapto or epoxy silanes are effectively applied to the glass fiber surfaces in liquid form, i.e. as solutions or emulsions in water, in $C_4$–$C_{16}$ hydrocarbon solvents such as pentane, hexane, heptane, benzene, toluene, xylene, etc., or in organic solvents such as $C_2$–$C_6$ alkanols (e.g. isopropyl alcohol, sec.-butyl alcohol, etc.), $C_3$–$C_8$ ketones (e.g. acetone, methylethyl ketone, etc.) and chlorinated alkanes such as carbon tetrachloride, chloroform and ethylene dichloride. For the purpose of convenience herein and in the appended claims, the term "silane" will be understood to include the unhydrolyzed form (i.e. the silane), the partially or fully hydrolyzed form (i.e. the silanol), the condensation products resulting from the partially or fully hydrolyzed form of the silane (i.e. the siloxane, also known as polysiloxane), and mixtures of the aforesaid forms. If desired, the liquid composition containing the silane may also contain binders, sizing agents and/or lubricants as long as these are chosen so as not to interfere with the subsequent action of the silane bonding to the elastomer coating. Although it is preferred that the silane be applied to the siliceous surface, it may also be applied by mixing the silane into the rubber compound.

The liquid composition containing 0.1–5 wt. %, preferably 0.3–2 wt. %, of the silane is applied to the surface of glass fibers. This treatment step is preferably carried out on glass monofilaments as they emerge from the glass spinnerets, but may also be carried out on a plurality of monofilaments (i.e. a strand), a plurality of strands (i.e. a yarn), woven glass cloth or any of the other forms of glass fibers which are treated with the liquid composition containing the silane for a fraction of a second to 60 minutes at temperatures up to 200°F. so as to deposit at least a monomolecular layer, preferably a layer of 10–40 molecules thick, of the silane on the glass fiber surface. This silane layer generally corresponds to a deposit of from about 0.03 to about 10 wt. %, preferably about 0.05 to about 2.0 wt. %, more preferably 0.1 to 1.0 wt. %, of the silane, based on the glass fiber weight.

The method of applying on the glass fiber surfaces the liquid composition containing the silane is not critical. The silane may be applied by wiping the liquid composition onto the glass fibers or by other conventional coating methods, e.g. spray coating, roller coating, flow coating, etc.

The silane-treated glass fiber may be immediately used as is for the second step described below or is washed with some of the water or hydrocarbon solvents or organic solvents disclosed above. Preferably, the silane-treated glass fiber is dried, prior to the second step, to remove substantially all of the diluent or solvent employed in the liquid composition containing the silane. Air drying at room temperature for 10 minutes to 48 hours or oven drying at temperatures of up to 300°F. for 10 seconds to 12 hours will usually suffice to evaporate off any diluent or solvent and set the silane to the glass surface.

In the second step for preparing the rubber reinforcing article, the silane-treated reinforcing agent is subsequently treated with a liquid composition containing 5 to 70, preferably 15 to 55, wt. % of a curable elastomer. The liquid composition may be in the form of an aqueous emulsion, organic solvent solution (using a solvent mentioned hereinabove), a plastisol, an organosol, a dispersion, a cement or latex.

The elastomer may be any curable (but uncured) natural or synthetic elastomeric polymer such as natural rubber; ethylene-alpha olefin copolymers such as amorphous ethylene-propylene-copolymers; ethylene-alpha olefin-diolefin terpolymers such as ethylene-propylene-cyclopentadiene, ethylene-propylene-hexadiene, ethylene-propylene-methylenenorbornene, etc.; styrene-butadiene copolymers (SBR); butadiene-acrylonitrile copolymers (NBR); polybutadienes; polyisoprenes; polychloroprenes (neoprenes); butyl rubbers; chlorinated or brominated butyl rubbers; chlorosulfonated polyethylenes ("Hypalons"); etc. Mixtures of two or more of these elastomers may also be used in the liquid composition.

Preferably the liquid composition containing the elastomer contains about 0.2 to 10 parts, especially 0.3 to 5 parts, of at least one curing agent for the elastomer. It should be understood, however, that a curing agent for the elastomer is not absolutely necessary since the rubbery matrix (which is to be reinforced with the elastomer-coated glass fiber) always contains at least one curing agent useful therefor. It has been found that during the curing step wherein the elastomer-coated glass fiber-rubbery matrix composite is heated as described below, sufficient curing agent will usually migrate from the rubber matrix to the elastomer coating and cure the latter.

The curing agent which may be employed in conjunction with the elastomer may be any one or more of those known in the prior art as being suitable for the particular elastomer employed, i.e. sulfur, sulfur type compounds, vulcanization accelerators, quinones, organic peroxides, heat reactive resins, metal oxides, etc. If desired, conventional elastomer pigments, stabilizers, plasticizers, fillers, antioxidants, extender oils, carbon blacks, etc. may also be incorporated in the liquid composition containing the elastomer.

The liquid composition containing the elastomer may be applied to the silane-treated glass fibers in the same manner as that described hereinabove for the treatment of the glass fibers with the liquid composition containing the silane. After treatment of the silane-treated glass fiber with the liquid composition containing the elastomer, the resultant product is preferably dried to remove substantially all of any diluent or solvent used in applying the silane and elastomer. Drying may take place in air at room temperature for 5 minutes to 48 hours or more; alternatively, the elastomer coated glass fiber may be dried at temperatures of 100°F. to 1,000°F. for 5 seconds to 24 hours or more. In general, the drying conditions may vary considerably, depending on the types and amounts of diluents or solvents used as well as the thickness of the silane and elastomer coatings and whether the drying step is completed before or after the coated glass fiber is wound up or spooled.

If a curing agent was employed in conjunction with the elastomer, the elastomer-coated glass fiber may be dried at such temperatures and times so as to produce a substantially complete cure of the elastomer; generally heating at 200°F. to 1,500°F. for 5 seconds to 5 hours or more, depending on the curing agent, elastomer of choice and whether the curing is done before or after the coated glass fiber is wound up or spooled, will suffice to obtain a substantially complete cure of the elastomer.

Preferably, the elastomer coated glass fiber is dried at such temperatures and times so as to produce only a partial cure of the elastomer. Particularly good results, as regards the reinforcement of rubbers, are obtained if the elastomer-coated glass fiber is dried under relatively mild conditions such that the elastomer undergoes no cure or only a slight cure. Generally, heating at 200°F. to 800°F. for 5 seconds to 5 hours, preferably 250°F. to 330°F. for 10 seconds to 120 minutes (depending on the curing agent, elastomer of choice and whether the drying is done before or after the coated glass fiber is wound up or spooled) will result in an incomplete cure of the elastomer.

The dried uncured, partially cured or substantially fully cured elastomer-coated glass fiber may then be used for the reinforcement of natural or synthetic rubbers. The natural or synthetic rubbers to be reinforced must contain about 0.2 to 100 parts or more, per 100 parts of the rubber, of at least one curing agent for the rubber of choice. These curing agents are well known in the prior art and include materials such as sulfur; tellurium, selenium or sulfur-type compounds; peroxides, accelerators, quinones, metal oxides, phenol-aldehyde resins, etc. If desired, the rubber to be reinforced may also be compounded with conventional adjuvants such as silica fillers, clay fillers, carbon blacks, extender oils, plasticizers, metal oxides, fatty acids, stabilizers, antioxidants, coloring agents, flame inhibitors, resins, etc.

Reinforcement of the desired natural or synthetic rubber takes place by contacting the dried elastomer-coated glass fiber with the rubber to be reinforced either contiguously or intermingled in conventional vulcanizing equipment and curing the resultant elastomer-coated glass fiber-rubber composite at a temperature of about 250°–400°F., preferably 280°–330°F., for about 5 to about 120 minutes, preferably 10–45 minutes under pressures of about 5 to about 1,000 psig, preferably 50–600 psig.

The rubber to be reinforced may be any of those referred to hereinbefore as an "elastomer" for use as the coating on the silane-treated glass fiber. However, it should be understood that the rubber to be reinforced need not necessarily be the same polymer as that chosen for the elastomer coating. Once the surfaces of the glass fiber have been substantially coated with the elastomer as described above, the chemistry which occurs during the reinforcement process is that involved in the bonding of two same or dissimilar rubbers to each other. Without wishing to be restricted to any theory, it is believed that during the reinforcement process (which takes place at elevated temperatures) any curing agent present in the elastomer coating serves to condense the silane with the elastomer coating. Simultaneously, the curing agent present in the rubber to be reinforced causes a tight bond between the rubber and the elastomer top coating on the glass fiber. Although it is preferable that the elastomer coating on the glass fiber contain at least one curing agent for said elastomer, good results are nevertheless obtained from the use of an elastomer coating which contains no curing agent since sufficient curing agent will generally migrate from the rubber to be reinforced to the elastomer coating (during the reinforcing process) to cause at least a partial cure of the elastomer coating. It is to be recognized by those skilled in the art that the rubber to be reinforced and/or the elastomer which forms the top coating on the glass fiber are generally selected on the basis of their known compatibility with each other and the curing system is generally one which has been proven to be effective for bonding the selected rubber to be reinforced to the selected elastomer top coating on the glass fiber.

The elastomer-coated glass fiber, particularly if a yarn, is twisted and especially if such yarns are plied to form cords, are advantageously employed in the preparation of reinforced hoses, belts, tires, etc. For example, tires reinforced with the elastomer-coated glass fiber of the present invention are stronger, more durable, more dimensionally stable, more resistant to heat than conventional tires.

The following examples are submitted to illustrate the invention. Unless otherwise indicated, all parts and percentages in the specification are based upon weight.

EXAMPLE 1

Rubbery polymer compositions were bonded to glass containing 3,4-epoxycyclohexylethyl trimethoxysilane thereon as follows:

HG–28 fiber glass cloth (a taffeta weave) having a starch-oil sizing was cleaned by heating at 600°F. for 24 hours followed by heating at 700°F. for 56 hours. Thereafter the heat-cleaned cloth was immersed for about 1 minute in a 1.7 wt. % solution of the above silane in benzene, and then the cloth was dried in air. Samples of the treated cloth were sandwiched between two layers about 0.095 inch thick of the rubber compositions shown below. This assembly was in turn sandwiched between two layers of canvas for the purpose of backing, i.e., so that the rubber composition is strengthened such that it can be severely pulled in the test to determine the force necessary to pull the rubber away from the glass. A piece of Mylar film (polyethylene terephthalate resin) was inserted at one end of the sample between the rubber and fabric to provide an opening for the start of subsequent adhesion test. The samples were then press cured at 307°F. for the times shown below at a pressure of 500 psig on the mold. A 1-inch wide specimen was then died out of the sample for strip adhesion test, which was run on an Instron tester at a jaw separation rate of 2 inches per minute.

The rubbery compositions used in this experiment are as follows:

|  | Neoprene | Chlorobutyl |
|---|---|---|
| Neoprene W (a) | 100 | — |
| Enjay Butyl HT 10-66 (b) | — | 100 |
| Fine Thermal Black | 50 | — |
| Fine Furnace Black | — | 50 |
| Magnesium Oxide | 4 | 2 |
| Stearic Acid | 0.5 | 1 |
| Aminox (c) | 0.5 | — |
| Dibutyl Phthalate | 10.0 | — |
| Flexon 765 (d) | — | 10 |
| Zinc Oxide | 5 | 3 |
| Benzothiazyl Disulfide | — | 2 |
| Tetramethyl Thiuram Disulfide | — | 1 |

(a) Polymer of 2-chlorobutadiene-1,3, Mooney Viscosity (ML, 2½ min. at 212°F.) 48
(b) Chlorinated isobutylene-isoprene copolymer
    Isobutylene, %    97.0
    Isoprene, %    1.8
    Chlorine, %    1.2
    Mooney Viscosity,
    (ML, 8 min. at 212°F.)    55
(c) A low temperature reaction product of diphenylamine and acetone sold as a rubber antioxidant.
(d) A hydrocarbon process oil
    Viscosity, SSU/100°F.    490
                SSU/210°F.    57.3
    Aniline Point, °F.    216
    Specific Gravity    0.899
    Saturates, wt. %    78.3
    Aromatics, Wt. %    20.8
    Polar Materials, wt. %    0.9

Adhesion data on the samples of this example are as follows:

| Sample | Rubber Composition | Minutes of Cure | Adhesion, Lbs. Pull/In. |
|---|---|---|---|
| 1 | Neoprene | 60 | 32 |
| 2 | Chlorobutyl | 50 | 32 |

In addition, control samples were run exactly as above except that the glass fabric was not treated with any silane. The adhesion results are as follows:

| Sample | Rubber Composition | Minutes of Cure | Adhesion, Lbs. Pull/In. |
|---|---|---|---|
| 3 | Neoprene | 60 | 2 |
| 4 | Chlorobutyl | 50 | 3 |

This example shows that a chemical coupling agent is required to bond rubbery polymer compositions to glass, and that 3,4-epoxycyclohexylethyl trimethoxysilane is an excellent chemical coupling agent for this purpose.

EXAMPLE 2

This example was run in the manner of Example 1 except that the heat-cleaned glass cloth of HG–28 weave was treated with a 1.7 wt. % solution of glycidoxypropyl trimethoxysilane in benzene in the manner shown in Example 1. The rubber compositions employed in this work were the Neoprene composition of Example 1 and also the following nitrile rubber composition:

|  | Nitrile |
|---|---|
| Paracril C (a) | 100 |
| Semi-reinforcing Furnace Black | 50 |
| Magnesium Oxide | 3 |
| Zinc Oxide | 5 |
| Stearic Acid | 1 |
| Aminox (b) | 0.5 |
| Dibutyl Phthalate | 15 |
| Sulfur | 1 |
| Tetramethyl Thiuram Monosulfide | 0.6 |

(a) A commercially available nitrile rubber of the following composition and Mooney vicosity:
  Butadiene, % 65
  Acrylonitrile, % 35
  Mooney Viscosity
   (ML, 2 min. at 212°F.) 85
(b) Aminox as described in Example 1.

Adhesion samples were assembled, cured and tested as in Example 1 with the following results:

| Sample | Rubber Composition | Minutes of Cure | Adhesion, Lbs. Pull/In. |
|---|---|---|---|
| 1 | Neoprene | 50 | 58 |
| 2 | Nitrile | 20 | 31 |

This example shows that rubbery polymer compositions adhere strongly to glass that has been treated with glycidoxypropyl trimethoxysilane.

EXAMPLE 3

This example shows alternate methods of applying the epoxy silanes of Examples 1 and 2 to glass.

A. 5 g. of 3,4-epoxycyclohexylethyl trimethoxysilane were dissolved in 495 ml. of an equi-volume blend of distilled water and isopropyl alcohol. Heat-cleaned glass cloth of HG–28 weave was immersed in this solution for about 1 minute and then was hung up to dry in air. B. 5 g. of glycidoxypropyl trimethoxysilane were dissolved in 495 ml. of distilled water. Heat-cleaned glass cloth of HG–28 weave was immersed in this solution for about 1 minute and then was hung up to dry in air.

The neoprene composition of Example 1 was used to test the rubber-to-glass bonding characteristics of both of the above treated glass fabrics; and in addition, the glass fabric treated as in "B" above was examined for bonding with the nitrile rubber composition of Example 2. The samples were assembled, cured, and tested as described in Example 1 with the following results:

| Sample | Glass Treatment | Rubber Composition | Minutes of Cure | Adhesion, Lbs. Pull/In. |
|---|---|---|---|---|
| 1 | A | Neoprene | 50 | 56 |
| 2 | B | Neoprene | 50 | 58 |
| 3 | B | Nitrile (NBR) | 15 | 40 |

This example shows that the epoxy silanes do not require hydrocarbon solvents for the purpose of applying them to glass fabrics. It is possible to apply them to glass from water or water and alcohol solutions.

EXAMPLE 4

A 2 wt. % solution of gamma-mercaptopropyl trimethoxysilane in toluene was prepared and used for treating HG–28 heat-cleaned glass fabric. An adhesion test as previously described in Example 1 was then run with the following Neoprene composition:

|  | Parts by Weight |
|---|---|
| Neoprene W (a) | 100 |
| Carbon Black | 50 |
| Magnesium Oxide | 4 |
| Zinc Oxide | 5 |
| Aminox | 0.5 |
| Stearic acid | 0.5 |
| Dibutyl phthalate | 10 |

(a) Neoprene as in Example 1-B.

Cure was at 307°F. for 15 and 30 minutes. Adhesions were 20 and 18 lbs., respectively, for the two cures, based on 1-inch wide strip samples.

EXAMPLE 5

A sample of the gamma-mercaptopropyl trimethoxysilane was partially hydrolyzed by mixing 0.1 mole (19.6 grams) with 0.1 mole (1.8 grams) of water. Mixture was shaken to give solution and then allowed to stand 24 hours prior to use. It was applied as a 1.5% solution in benzene to the HG–28 fabric and then allowed to air dry. The treated cloth was tested with the same Neoprene composition described in Example 4 and found to have a strip adhesion value of 53 lbs. when cured 60 minutes at 307°F. Failure was in the rubber compound, not at the glass-rubber interface.

EXAMPLE 6

Example 5 was repeated, except that the treated cloth was heated at 250°F. for 30 minutes prior to use in the Neoprene adhesion test. Adhesion was 79 lbs. and again the failure was in the rubber compound.

EXAMPLE 7

Fabric coated with the hydrolyzed mercaptosilane as in Example 5 was tested using the following chlorobutyl composition.

| | Parts by Weight |
|---|---|
| Enjay Butyl HT 10-66 (chlorobutyl) (a) | 100 |
| Fine Furnace Carbon Black | 50 |
| Magnesium Oxide | 2 |
| Zinc Oxide | 3 |
| Stearic acid | 1 |
| Necton-60 (Mineral oil) (b) | 10 |
| Altax (benzothiazyl disulfide) | 2 |
| Tuads (tetramethyl thiuram disulfide) | 1 |

(a) A chlorinated butyl rubber having a viscosity average molecular weight of 357,000, a 1.5 mole percent unsaturation and about 1.1 to 1.3 wt. % chlorine.
(b) A lubricating oil quite similar to Flexon 765 of Example 1.

Cure was effected at 307°F. for 30 and 60 minutes. Adhesion for the 30 minute cure was 59 lbs. and that at 60 minutes, 49 lbs. Separation was between glass and rubber in each case.

EXAMPLE 8

HG-28 cloth which has been washed with 1% aqueous acetic acid at 75°F. followed by water washing at 75°F. was dried at 250°F. for 1/2 hour. Samples were then treated with aqueous solutions of hydrolyzed beta-mercaptoethyl trimethoxysilane (Y-4522) as follows:

1. 2% Y-4522 in 0.05% acetic acid.
2. 1% Y-4522 in 0.05% acetic acid.
3. A 4% aqueous emulsion of a 30 mole % styrene-butadiene copolymer resin of about 15,000 molecular weight and of high 1,2-type unsaturation. It also contained 1% of the Y-4522.
4. As (3), but the emulsion also contained 2% of dicumyl peroxide based on the resin.
5. Y-4522 which had been ⅛ hydrolyzed was applied to the glass as a 1.5% solution in toluene.
6. No treatment, glass washed and dried only.

After each specimen of cloth was treated it was air dried and then heated at 212°F. for 1 hour before testing.

The following three rubber compounds were tested with each of the fabrics so treated. The rubber compositions were as follows:

A. Neoprene Composition — cured at 307°F. for 60 minutes.

| Component | Parts by Weight |
|---|---|
| Neoprene W (a) | 100 |
| FT Black (b) | 40 |
| Magnesium Oxide | 4 |
| Stearic Acid | 0.5 |
| Aminox (c) | 0.5 |
| Zinc Oxide | 5 |
| Dibutyl Phthalate | 15 |

(a) A commercial grade of polychloroprene
(b) Fine thermal carbon black
(c) A ketone-diaryl amine used as a rubber and latex antioxidant (Naugatuck Chemical)

B. Polyisoprene Composition:

| | Parts by Weight |
|---|---|
| Polyisoprene (cis-isomer) | 100 |
| SRF Black | 50 |
| Zinc Oxide | 5 |
| Stearic Acid | 1 |
| Dicup-40 HAF | 3.75 |

Cure was 20 minutes at 307°F.

C. SBR Composition:

| | Parts by Weight |
|---|---|
| SBR-1500 (a) | 100 |
| SRF Black | 50 |
| Aminox | 0.5 |
| Zinc Oxide | 5 |
| Stearic Acid | 1 |
| Santocure-N-S (N-tert.-butyl-2-benzothiazole sulfenamide) | 0.4 |
| Sulfur | 2.5 |

(a) A commercial grade of butadiene-styrene rubber containing about 23% of combined styrene.

Cure was 45 minutes at 202°F.

Adhesion test results obtained with the six types of cloth for each of the three rubbery compositions were as follows:

| Fabric Pretreatment | Adhesion, Lbs. Pull/In. | | |
|---|---|---|---|
| | A | B | C |
| (1) | 50 | 2 | 25 |
| (2) | 53 | 2 | 34 |
| (3) | 56 | 3.5 | 19 |
| (4) | 52 | 3.0 | 21 |
| (5) | 52 | 1.5 | 24.5 |
| (6) | 13.5 | 1.5 | <2 |

The above (C) SBR composition without any Santocure-N-S using glass fabric pretreatment (2) was also tested using a 3 hour cure at 292°F. It showed a remarkable adhesion test of 45 lbs. of pull per inch. It is all the more remarkable since the curing agents were solely zinc oxide and sulfur and no other accelerators or curing aids were employed.

As shown in previous examples, the ZnO-MgO cure of a halogenated rubber results in excellent adhesion using the mercapto silane glass pretreatment. The presence of the butadiene-styrene copolymer resin as a sizing ingredient is not detrimental to this adhesion. A peroxide curative is not effective with the mercapto silane as shown by compound B. Similar testing with a peroxide cured NBR (nitrile) rubber composition also resulted in no adhesion. Examples 4 through 8 show that the mercapto silanes are highly effective for bonding halogenated rubbers cured with metal oxides and for sulfur cures of all kinds.

EXAMPLE 9

Gamma-glycidoxypropyl trimethoxysilane (an epoxy silane) was dissolved in a 50/50 blend of isopropyl alcohol and water to give a 6 wt. % solution. After standing for one hour the solution was diluted to 1½ wt. % of the original silane. Heat-cleaned glass cloth of HG-28 weave was washed with 1 wt. % acetic acid followed by water, and then was dried in air followed by ½ hour in an oven at 220°F. This cloth was then immersed for about 1 minute in the 1½ wt. % silane solution, was dried in air, and then heated for ½ hour at 212°F. The treated cloth was then used for adhesion testing according to the technique shown in Example 1 except that the rubber composition used was of SBR as follows:

| | |
|---|---|
| SBR-1500 (a) | 100 |
| Semi-reinforcing Furnace Black | 50 |
| Aminox (b) | 0.5 |
| Stearic Acid | 3 |
| Santocure NS (c) | 0.65 |
| Sulfur | 2.5 |
| Zinc Oxide | 5 |

(a) Composed of about 76.5% butadiene and about 23.5% styrene, Mooney viscosity of the particular lot used was 51 (ML, 2 min. at 212°F.).
(b) As described in Example 1.
(c) N-tertiary butyl-2-benzothiazole sulfenamide.

Adhesion specimens were assembled and tested as in Example 1, the cure conditions being 30 minutes at 307°F. The resulting adhesion strength was found to be 31 lbs. pull per inch.

EXAMPLE 10

HG-28 fiber glass cloth is heat-cleaned and thereafter treated with a 1.4 wt. % solution of gamma-mercaptopropyl trimethoxysilane in water. Following air drying at ambient temperature for 1 hour and oven drying at 250°F. for ½ hour, samples of the silane-treated fiber glass cloth are coated with elastomer compounds A and B as shown in Table I. The elastomer compounds are applied to the silane-treated cloth in the form of a "cement" in sufficient methyl ethyl ketone to afford a concentration of 20 wt. % based on the elastomer compound.

The elastomer-coated fiber glass cloth samples are thereafter dried at 70°F. for 16 hours and then sandwiched between two canvas-backed slabs of the rubber matrix compound shown in Table I, and the elastomer-coated cloth-rubber composites are then cured in a press for 20 minutes at 307°F. and 500 psi pressure. For comparative purposes, one composite is made with the silane treated glass cloth (with no elastomer coating thereon) and the rubber matrix compound only.

TABLE I

| | Elastomer Compound A | Elastomer Compound B | Rubber Matrix Compound |
|---|---|---|---|
| Paracril-C[(1)] | 100 | 100 | 100 |
| SRF Black | 25 | 25 | 50 |
| Ketone-diarylamine antioxidant | 0.5 | 0.5 | 0.5 |
| Zinc Oxide | 5 | 5 | 5 |
| Stearic Acid | 1 | 1 | 1 |
| Dibutyl Phthalate | — | — | 15 |
| Sulfur | — | 1 | 1 |
| Tetramethyl Thiuram Monosulfide | — | 0.6 | 0.6 |

[(1)]A butadiene-acrylonitrile rubber containing approximately 35% of combined nitrile.

Measurement of the adhesive strength of the rubber matrix to the glass fiber indicated that when the silane-treated fiber glass is thereafter coated with an elastomer containing no curatives, the adhesion of rubber to fiber glass is some 30% greater than that obtained with silane-treated fiber glass having no elastomer coating thereon. The beneficial effect of the elastomer coating upon adhesion is heightened an additional 50% by incorporating curatives therein as in elastomer compound B and coating the elastomer compound on fiber glass treated with the silane.

Since it will be obvious to one skilled in the art that numerous modifications may be made without departing from the scope and spirit of this disclosure, this invention is not intended to be limited to the specific embodiments disclosed herein.

What is claimed is:

1. A process for preparing a rubber-reinforcing article which comprises, in combination, the steps of:
   a. treating the surface of glass fibers with a liquid composition containing a silane selected from the group consisting of a saturated silane, its corresponding silanol, its corresponding siloxane, and mixtures thereof, said silane having the general formula:

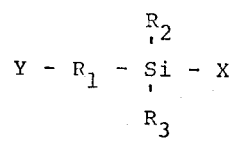

wherein Y is selected from the group consisting of mercapto and epoxy; $R_1$ is selected from the group consisting of $C_2$ to $C_{16}$ alkylene, isoalkylene, and cycloalkylene, each of from 2 to 16 carbon atoms; X is selected from the group consisting of halogen, hydroxyl, alkoxy, and acyloxy; and $R_2$ and $R_3$ are independently selected from the group consisting of $Y-R_1—$, $X—$, and methyl;

b. contacting the treated surface of the reinforcing agent obtained in step (a) with a liquid composition containing an elastomer in an uncured stage; and
   c. drying the resultant product from step (b) until it is substantially free of any diluent or solvent thereby obtaining a reinforcing agent whose surfaces have been substantially coated with about 10 to 60 wt. %, based on the total weight of the elastomer-coated reinforcing agent, of said elastomer.

2. A process as in claim 1 wherein the liquid composition containing the uncured elastomer contains 0.2 to 10 parts per 100 parts of elastomer, of at least one curing agent for said elastomer.

3. The process of claim 1 wherein the silane is 3,4-epoxycyclohexylethyl trimethoxysilane, glycidoxypropyl trimethoxysilane, gamma-mercaptopropyl trimethoxysilane, their corresponding silanols, their corresponding siloxanes or mixtures thereof.

4. A rubber-reinforcing article which comprises glass fibers whose surfaces substantially contain:
   a. an initial coating of a silane selected from the group consisting of a saturated silane, its corresponding silanol, its corresponding siloxane and mixtures thereof, said silane having the general formula:

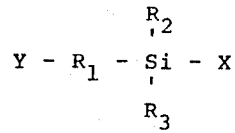

wherein Y is selected from the group consisting of mercapto and epoxy; $R_1$ is selected from the group consisting of $C_2$ to $C_{16}$ alkylene, isoalkylene, and cycloalkylene, each of from 2 to 16 carbon atoms; X is selected from the group consisting of halogen, hydroxyl, alkoxy, and acyloxy; and $R_2$ and $R_3$ are independently selected from the group consisting of $Y-R_1-$, $X-$, and methyl; and b. an elastomer top coating comprising 10 to 60 wt. %, based on the total weight of the elastomer-coated reinforcing agent, of an elastomer in an uncured stage, said elastomer coated-reinforcing agent being substantially free of diluents or solvents.

5. The rubber-reinforcing article of claim 4 wherein the uncured elastomer top coating contains 0.2 to 10 parts per 100 parts of elastomer, of at least one curing agent for said elastomer.

6. The rubber-reinforcing article of claim 4 wherein the silane is 3,4-epoxycyclohexylethyl trimethoxysilane, glycidoxypropyl trimethoxysilane, gamma-mercaptopropyl trimethoxysilane, their corresponding silanols, their corresponding siloxanes or mixtures thereof.

7. A process for reinforcing rubbery polymers which comprises, in combination, the steps of:
a. contacting the rubber-reinforcing article of claim 4 with a matrix comprising a rubber containing at least one curing agent for said rubber; and
b. curing the matrix in contact with said rubber-reinforcing article.

8. A process for reinforcing rubbery polymers which comprises, in combination, the steps of:
a. contacting the rubber-reinforcing article of claim 5 with a matrix comprising rubber containing at least one curing agent for said rubber; and
b. curing the matrix in contact with said rubber-reinforcing article.

9. The product of claim 7.

10. The product of claim 8.

11. Glass fibers and a coating on the glass fiber surfaces to improve their bonding relationship with synthetic and natural elastomeric materials in which the coating contains an anchoring agent in the form of an organosilicon compound having an SH group on an organic group attached to the silicon atom and which is capable of chemical bonding with the elastomeric material.

12. A product as claimed in claim 11 in which the organo silicon anchoring agent is selected from the group consisting of a silane, its hydrolysis product, and its polymerization product in which the silane is represented by the formula $R_nSiX_{(4-n)}$ in which $n$ is a whole number from 1 to 3, X is a highly hydrolizable group and R is an organic group in which at least one of the organic R groups contains an SH group.

13. A product as claimed in claim 11 in which the synthetic and natural elastomeric material is a curable rubber.

14. A product as claimed in claim 11 in which the coating is present on the glass fiber surfaces in at least a mono-molecular layer.

15. A product as claimed in claim 11 in which the anchoring agent is formulated as a component in combination with the synthetic and natural elastomeric material.

16. In the method of producing a glass fiber-elastomeric product wherein the elastomer is strongly bonded to the glass fiber surfaces, the steps of coating the glass fibers with a treating composition containing an anchoring agent in the form of an organo silicon compound having an SH group on an organic group attached to the silicon atom, drying the coated fibers and combining the coated fiber with an elastomeric material and then advancing the elastomeric material to a cured state.

17. The method as claimed in claim 16 in which the organo silicon compound is selected from the group consisting of a silane, its hydrolysis product, and its polymerization product in which the silane is represented by the formula $R_nSiX_{(4-n)}$ in which $n$ is a whole number from 1 to 3, X is a highly hydrolizable group and R is an organic group in which at least one of the organic R groups contains an SH group.

18. The method as claimed in claim 16 in which the treating composition contains the anchoring agent in an amount within the range of 0.1 to 5.0 percent by weight.

19. The method as claimed in claim 16 in which the treating composition contains the anchoring agent in an amount within the range of 0.5 to 2.0 percent by weight.

20. The method as claimed in claim 16 which includes the step of incorporating the anchoring agent into the uncured elastomeric material prior to combination between the elastomer material and the treated glass fibers.

21. The method as claimed in claim 16 in which the treating material is applied onto the glass fiber surfaces in at least a mono-molecular layer.

* * * * *